United States Patent
Lim et al.

(10) Patent No.: US 10,247,476 B2
(45) Date of Patent: Apr. 2, 2019

(54) FOOD WASTE DRYER UTILIZING WASTE HEAT

(71) Applicants: NDT ENGINEERING & AEROSPACE CO., LTD., Changwon-si (KR); INDUSTRY-ACADEMIC COOPERATION FOUNDATION GYEONGSANG NATIONAL UNIVERSITY, Jinju-si (KR)

(72) Inventors: Ki Hyun Lim, Changwon-si (KR); Dae Bin Song, Anyang-si (KR); Dae Hong Jung, Changwon-si (KR); Sung Min Choi, Changwon-si (KR); Jong Hyun Yoon, Changwon-si (KR); Sang Hyun Park, Anyang-si (KR)

(73) Assignees: NDT ENGINEERING & AEROSPACE CO., LTD., Changwon-si (KR); INDUSTRY-ACADEMIC COOPERATION FOUNDATION GYEONSANG NATIONAL UNIVERSITY, Jinju-si (KR)

( * ) Notice: Subject to any disclaimer, the term of this patent is extended or adjusted under 35 U.S.C. 154(b) by 0 days.

(21) Appl. No.: 15/677,031

(22) Filed: Aug. 15, 2017

(65) Prior Publication Data
US 2018/0112915 A1   Apr. 26, 2018

(30) Foreign Application Priority Data
Oct. 25, 2016 (KR) .................. 10-2016-0139479

(51) Int. Cl.
*F26B 11/14* (2006.01)
*F26B 21/00* (2006.01)
(Continued)

(52) U.S. Cl.
CPC ............ *F26B 11/14* (2013.01); *F26B 3/20* (2013.01); *F26B 3/22* (2013.01); *F26B 11/16* (2013.01);
(Continued)

(58) Field of Classification Search
CPC ...... F26B 11/14; F26B 21/004; F26B 23/028; F26B 25/005
(Continued)

(56) References Cited

U.S. PATENT DOCUMENTS

| 2,752,694 | A | * | 7/1956 | McCormick | ............ D06F 58/02 34/60 |
| 5,052,313 | A | * | 10/1991 | Walker | .................... F23G 5/006 110/204 |

(Continued)

FOREIGN PATENT DOCUMENTS

| KR | 100205918 | 7/1999 |
| KR | 1019990063136 | 7/1999 |

(Continued)

*Primary Examiner* — Stephen M Gravini
(74) *Attorney, Agent, or Firm* — Mark M. Friedman

(57) ABSTRACT

The present invention relates to an improved food waste dryer utilizing waste heat, which includes a main frame, a dryer drum with an access door, to be positioned in the main frame, and an agitator positioned in the dryer drum. The improved food waste dryer comprises: a waste heat supply unit, a heating jacket positioned on the outer surface of the dryer drum, with a hot-air inlet to receive the waste heat from the waste heat supply unit and a hot-air outlet to discharge the waste heat inside the dryer drum, and a condensation system positioned in the main frame, to remove moisture included in the interior air of the dryer drum to increase the drying efficiency of the food waste dryer utilizing waste heat.

2 Claims, 10 Drawing Sheets

(51) Int. Cl.
  *F26B 23/02* (2006.01)
  *F26B 25/00* (2006.01)
  *F26B 3/20* (2006.01)
  *F26B 3/22* (2006.01)
  *F26B 11/16* (2006.01)
  *F26B 21/04* (2006.01)
  *F26B 21/08* (2006.01)

(52) U.S. Cl.
  CPC ............ *F26B 21/004* (2013.01); *F26B 21/04* (2013.01); *F26B 21/086* (2013.01); *F26B 23/028* (2013.01); *F26B 25/005* (2013.01); *Y02P 70/405* (2015.11)

(58) Field of Classification Search
  USPC .............................................................. 34/74
  See application file for complete search history.

(56) References Cited

U.S. PATENT DOCUMENTS

| | | | | |
|---|---|---|---|---|
| 5,217,065 A * | 6/1993 | Green | ................... | F22B 27/165 165/115 |
| 5,680,712 A * | 10/1997 | Kiyokawa | ............... | F26B 3/283 34/196 |
| 6,173,506 B1 * | 1/2001 | Kruepke | ............. | A23N 12/083 34/225 |
| 7,024,800 B2 * | 4/2006 | Carin | .................... | F26B 19/005 34/576 |
| 7,028,415 B2 * | 4/2006 | Heinzen | .................... | F26B 5/08 34/312 |
| 7,404,262 B2 * | 7/2008 | Jurkovich | .............. | A23K 40/00 34/138 |
| 7,665,226 B2 * | 2/2010 | Tsuruta | .................. | A23B 4/015 219/688 |
| 8,042,283 B2 * | 10/2011 | Nakiri | ..................... | D06F 25/00 134/72 |
| 8,151,482 B2 * | 4/2012 | Moss | ........................ | F26B 3/06 159/16.1 |
| 8,166,669 B2 * | 5/2012 | Park | ........................ | D06F 25/00 134/10 |
| 8,365,433 B2 * | 2/2013 | Ogura | ....................... | C05F 9/02 34/339 |
| 9,429,362 B2 * | 8/2016 | Kanai | ..................... | F26B 17/22 |
| 9,562,720 B2 * | 2/2017 | Huang | ...................... | C08C 4/00 |
| 9,964,356 B2 * | 5/2018 | Moriyama | ............. | F26B 1/005 |
| 2017/0115060 A1 * | 4/2017 | Ashourian | ............ | B65G 19/10 |
| 2018/0112915 A1 * | 4/2018 | Lim | ........................ | F26B 11/14 |

FOREIGN PATENT DOCUMENTS

| | | | | |
|---|---|---|---|---|
| KR | 100283682 | | 3/2001 | |
| KR | 101026464 | | 4/2011 | |
| KR | 202012008539 | | 12/2012 | |
| WO | WO 9324800 A1 * | 12/1993 | ............. | F26B 23/02 |

\* cited by examiner

FOOD WASTE DRYER UTILIZING WASTE HEAT

TECHNICAL FIELD

The present invention relates to an improved food waste dryer utilizing waste heat, and more particularly, to an improved food waste dryer utilizing waste heat, in which a condensation system is improved to dry the food waste by using waste heat generated during a process of incinerating waste and released into the air, such that the interior air of the dryer is kept dry to increase the dryer efficiency.

BACKGROUND ART

Generally, as the scale of industry expands and the standard of living elevates, the amount of household waste including industrial waste increases, and therefore, the development of waste disposal plans or systems are actively progressed.

Particularly, most of the food waste, which has been socially seriously raised among the household waste, includes moisture and bad smell and easily decays with the passage of time.

One of the methods for disposing of the food waste is to bury it in a landfill. However, when the food waste is buried, the moisture included in the food waste contaminates soil and leaches into and contaminates a stream, river or water supply source.

To solve the aforementioned problems, Korean Patent Publication No. 10-0283682 (hereinafter, referred to as "Prior Art 1") discloses a "hot-air drying apparatus".

In Prior Art 1, the hot-air drying apparatus comprises a dryer 11 including a first tumbling barrel, second tumbling barrel and third tumbling barrel. Rollers 14, 14', which are supported to be rotatable by guide rollers 12, 12' positioned at one end of the first tumbling barrel and are driven by a chain belt (A) connected with a motor 13, are installed to rotate in contact with the outer surface of the other end of the first tumbling barrel. Agitation wings 19b, 19c, 20b, 20c are positioned at the inner and outer surfaces of the second and third tumbling barrels. The waste which is put into a hopper 3, 25 is dried by the hot air of a burner 2, 24 and the dried waste moves out through an outlet 17. In the hot-air drying apparatus, the dryer 11 is connected to a heater 1 at one end and to a cyclone centrifugal dust collector 22 at the other end by fitting a portion of an inlet 21 of the cyclone centrifugal dust collector 22 into the outlet 17 of the dryer 11.

In Prior Art 1, it is possible to reduce the consumption amount of energy to be combusted by the heater which is double-layer or triple-layer formed to make the food waste and agricultural sludge as resources upon drying. Simultaneously, the heater is efficiently cooled by air which flows into through an outside heating furnace. In the dryer including the three tumbling barrels, as the food waste swirls and proceeds, the moisture included in the food waste evaporates and the stinky smell of the food waste is removed in the third tumbling barrel, and the moisture content of the dried waste is uniform in the first and second tumbling barrels. As the dried waste finally passes through the cyclone centrifugal dust collector, the moisture content of the dried waste is controlled to be 60%~10%. Also, the food waste and agricultural sludge are processed by 2 ton~10 tons per hour.

However, Prior Art 1 has the problem in that, since the source of heat energy required for the drying process is raw chemical materials, a maintenance cost is excessively high.

PRIOR ART LITERATURE

Patent Document (Patent Document 1) Prior Art 1: Korean Patent Publication No. 10-0283682

DISCLOSURE

Technical Problem

Therefore, it is an object of the present invention to solve the above problems and to provide an improved food waste dryer utilizing waste heat, which dries the food waste by using the waste heat and significantly reduces maintenance and management costs.

It is another object of the present invention to provide an improved food waste dryer utilizing waste heat, which improves a condensation system, to remove moisture in the interior air of the dryer to keep a dry state and therefore to further increase the dryer efficiency.

Technical Solution

In accordance with an embodiment of the present invention to solve the above problems, there is provided an improved food waste dryer utilizing waste heat, which includes a main frame, a dryer drum with an access door, to be positioned in the main frame, and an agitator positioned in the dryer drum, the improved food waste dryer comprising: a waste heat supply unit, a heating jacket positioned on the outer surface of the dryer drum, with a hot-air inlet to receive the waste heat from the waste heat supply unit and a hot-air outlet to discharge the waste heat inside the dryer drum, and a condensation system positioned in the main frame, to remove moisture included in the interior air of the dryer drum to increase the drying efficiency of the food waste dryer utilizing waste heat.

The condensation system further comprises: a plurality of condensers connected to one another, to allow the movement of the interior air of the dryer drum, a fan positioned between the condensers, to transfer the interior air, and a cooling system to supply a coolant to the condensers to collect the moisture from the interior air, wherein the coolant of a different temperature is supplied to each of the condensers to remove the moisture of the interior air and to change the temperature of the interior air.

The condensers each include interior air guides, so that when the interior air passes the inside of the condensers, the moisture conflicts with the interior air guides, to increase the condensation efficiency of moisture through the coolant.

The condensers include a first condenser, a second condenser, a third condenser and a fourth condenser, the first condenser is provided with the coolant from the cooling system, the coolant released from the first condenser passes through the second, third and fourth condensers and then returns to the cooling system, and the first to fourth condensers are different from one another in size so that the condensation area and moisture condensation amount of each of the condensers vary.

The inside temperature of the dryer drum heated by the waste heat is 60° C.~70° C., the temperature of the coolant supplied from the cooling system to the first condenser is 25° C.~30° C., the temperature of the coolant released from the third condenser is 60° C., and the interior air of the fourth condenser is preheated by the coolant supplied to the fourth condenser.

The condensation system further comprises: a condensate water purification tank to purify condensate water generated by the condensers, and the condensate water purification tank further includes: a condensate water tank to collect the condensate water, wherein the condensate water collected in the condensate water tank which is added with zeolite and activated carbon to purify any contamination of the condensate water; and a deodorant tower such that the condensate steam generated by the condensate water is purified to be discharged.

Advantageous Effects

The improved food waste dryer utilizing waste heat according to the present invention significantly increases the use of waste energy and reduces the production cost of the product, by using the waste heat generated upon incinerating waste, rather than electric or fossil energy as the energy required during the drying process.

Further, since the condensation system is applied, the interior air of the dryer drum is kept dry, increasing the drying efficiency of the food waste dryer.

Further, since a plurality of condensers is used in the condensation system, moisture is removed from the interior air of the dryer drum through a number of steps, keeping a high rate of moisture removal.

Further, since the interior air guide is positioned in the condenser, when moisture of the interior air of the dryer is collected in the condenser, the moisture is more effectively collected through a large surface area.

Further, since the second heating jacket is applied, the temperature of the interior air from which the moisture is removed increases before it enters the dryer drum.

DESCRIPTION OF DRAWINGS

These and other aspects and advantages of the present invention will become apparent and more readily appreciated from the following description of the embodiment(s), taken in conjunction with the accompanying drawings, in which.

BEST MODE

Figure 1:
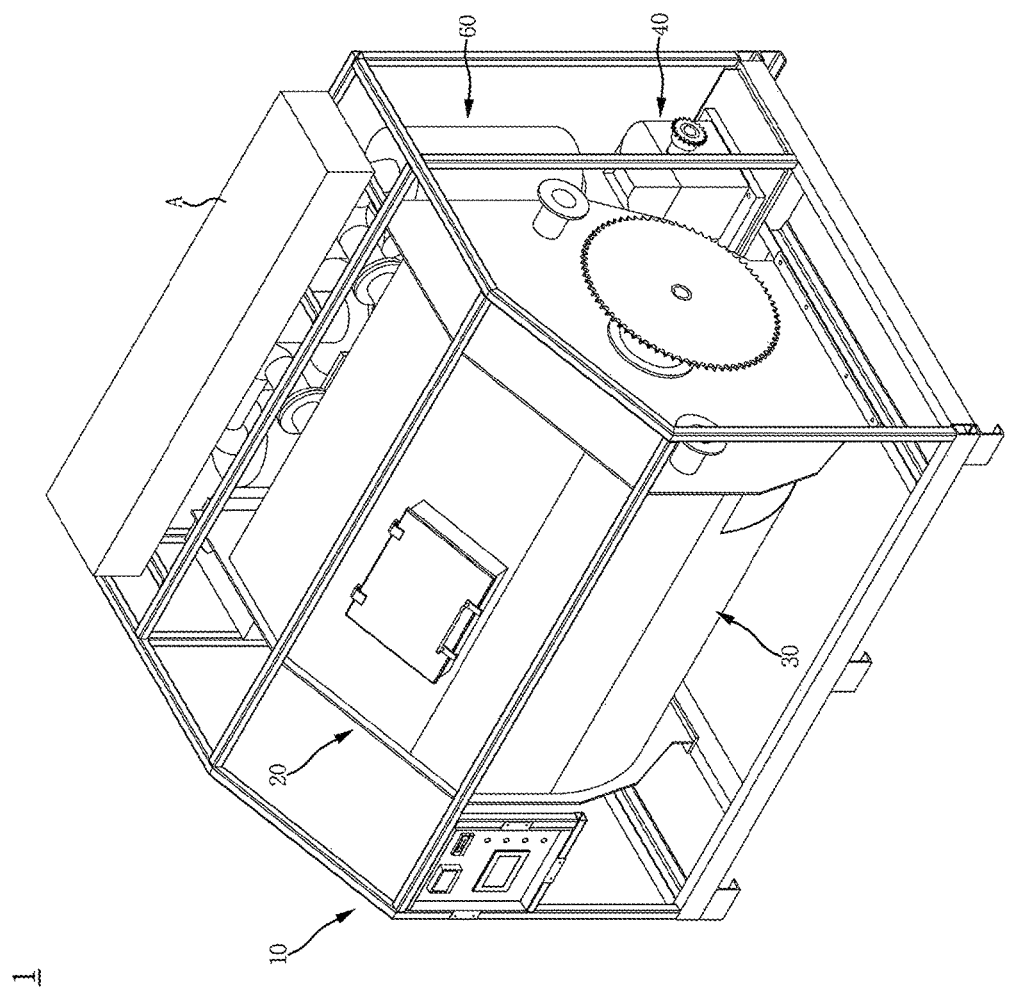
FIG. 1 is a perspective view of an improved food waste dryer utilizing waste heat according to the present invention.

It will be understood that words or terms used in the specification and claims shall not be interpreted as the meaning defined in commonly used dictionaries. It will be further understood that the words or terms should be interpreted as having the meaning and concept that are consistent with their meaning and concept in the context of the relevant art and the technical idea of the invention, based on the principle that an inventor/applicant may properly define the meaning of the words or terms to best explain the invention.

The technical characteristics of the present invention will be specifically described with reference to the accompanying drawings. The terms or words to describe the direction of an element (for example, "up", "down", "left", "right", "top" and "bottom", among others) are used based on the drawings.

An improved food waste dryer utilizing waste heat according to the present invention is to dry the food waste, wherein the heat energy required to dry the food waste is supplied by using waste heat. Therefore, any additional fuel is not needed and the interior air of the dryer is kept dry through a condensation system, thereby increasing the efficiency of drying the food waste by the use of the waste heat.

To this end, an improved food waste dryer 1 utilizing waste heat of the present invention comprises: a main frame 10, a dryer drum 20 with an access door positioned in the main frame 10, a heating jacket 30 positioned on an outer surface of the dryer drum 20, an agitator 40 positioned in the dryer drum 20, a waste heat supply unit 50 to supply waste heat to the heating jacket 30, and a condensation system 60 positioned at the main frame 10.

The main frame 10 is configured to secure the dryer drum 20, the agitator 40 and the condensation system 60.

Figure 2:
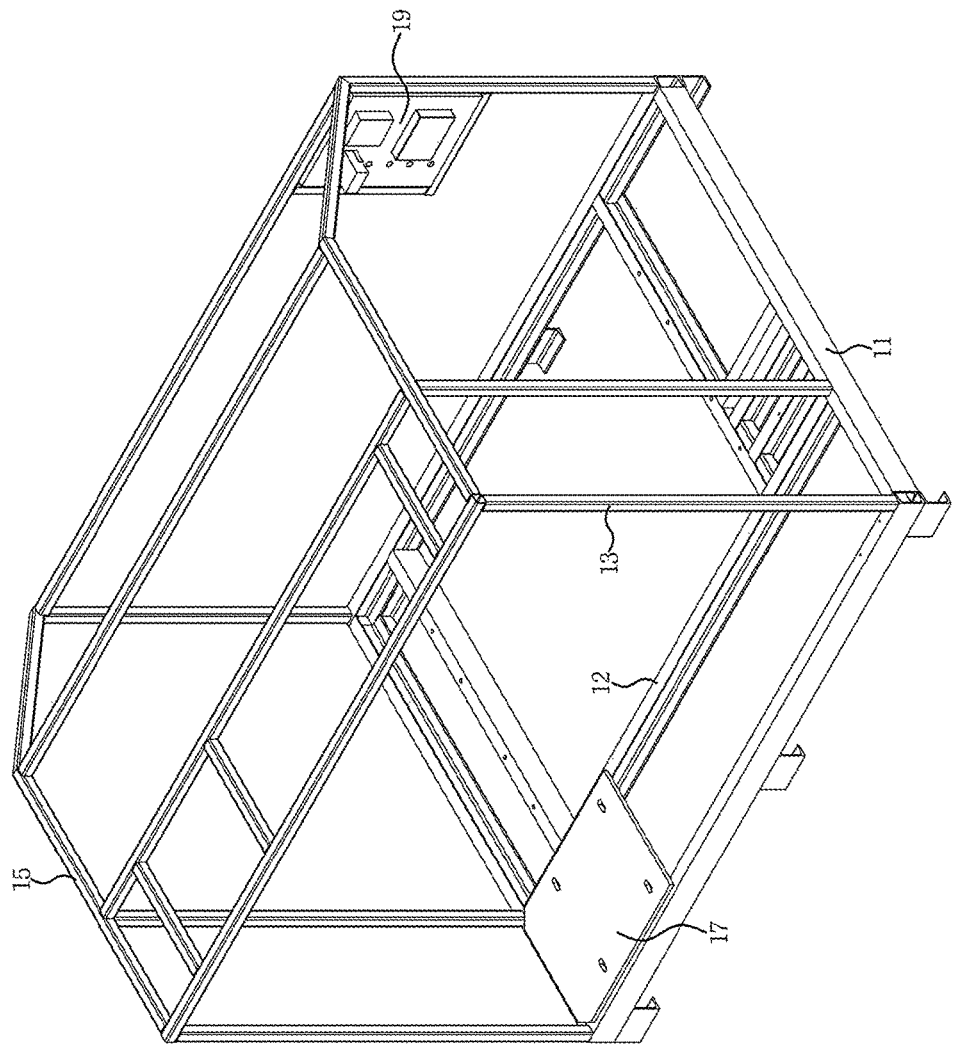
FIG. 2 is a perspective view of a main frame of FIG. 1.

In FIG. 2, the main frame 10 includes a bottom frame 11 in a rectangular shape, support frames 13 being each perpendicular to the bottom frame 11, and a top frame 15 positioned on the support frame 13.

A bottom frame reinforcing bar 12 is positioned at the bottom frame 11 and a connection plate 17 is positioned on the bottom frame reinforcing bar 12, such that the agitator 40 is stably positioned in the main frame 10.

A touch panel 19 is positioned in the main frame 10, to be operatively connected to a control unit to control each constitution.

The dryer drum 20 is configured to dry the food waste which is input.

Figure 3:
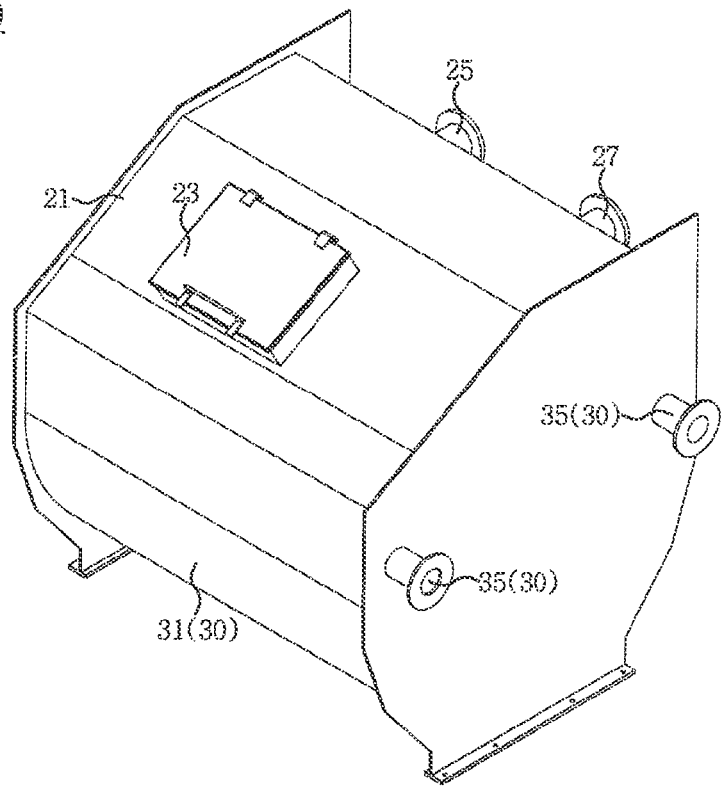
FIG. 3 is a mimetic diagram of a dryer drum and a heating jacket of FIG. 1.
Figure 3:
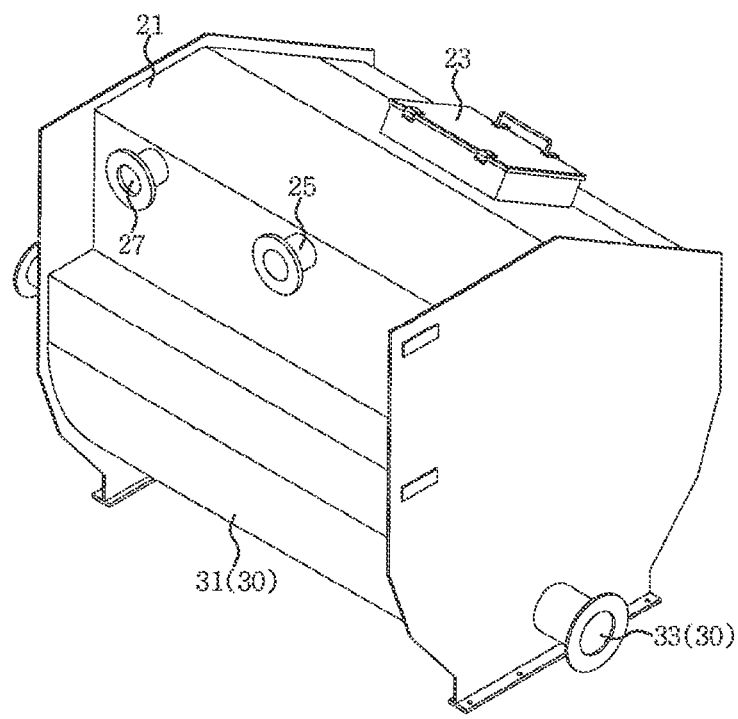
Figure 4:
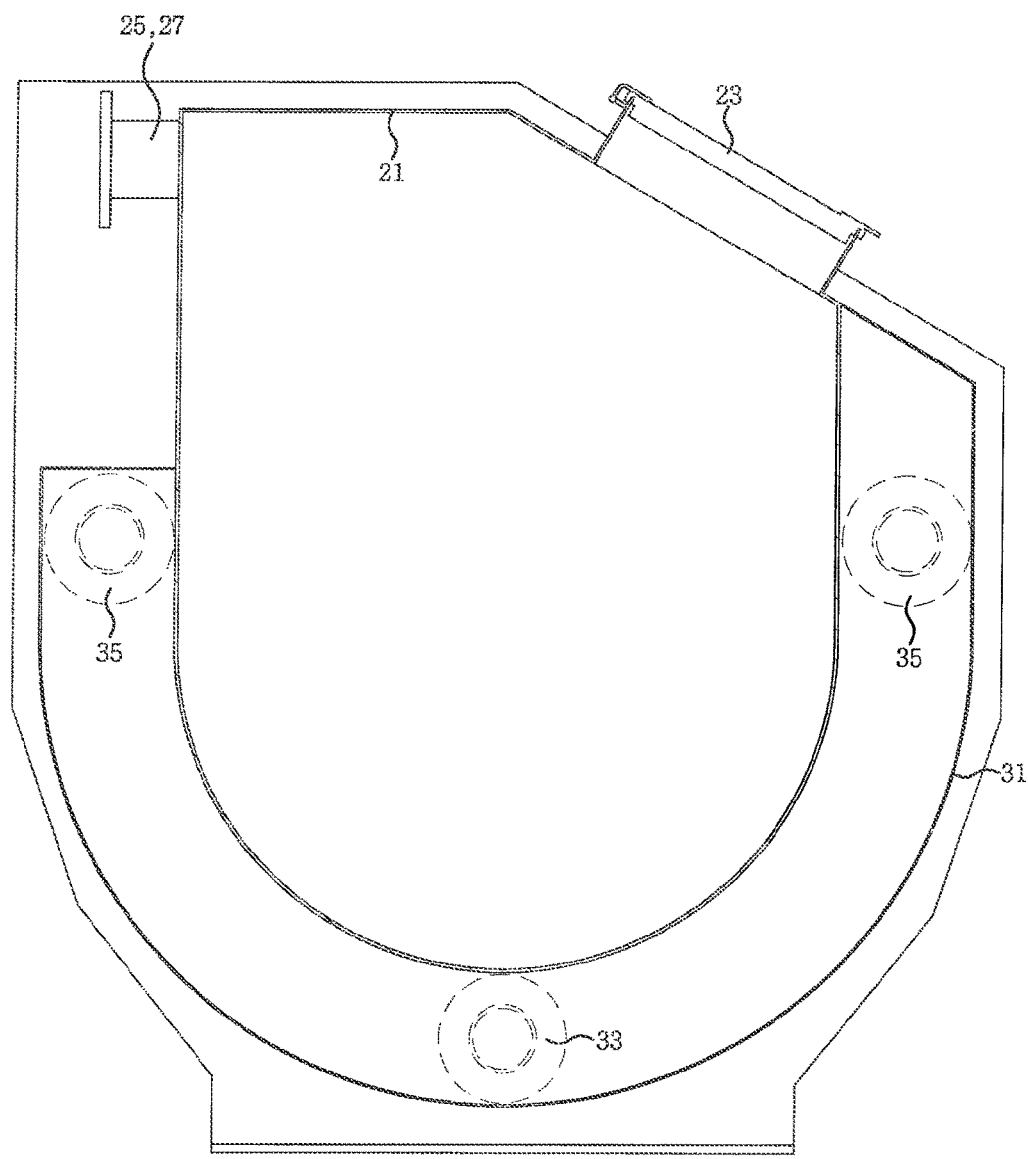
FIG. 4 is a cross-sectional view of the dryer drum and the heating jacket of FIG. 3.

In FIG. 3 and FIG. 4, the dryer drum 20 includes a dryer frame 21, an access door 23, an interior air outlet 25, and an interior air inlet 27. The dryer frame 21 is positioned in the main frame 10 and has a bottom in a semicircular shape. The access door 23, which is formed at the dryer frame 21, is to receive the food waste into the dryer frame 21. The interior air outlet 25, which is formed at one side of the dryer frame 21, is to discharge the interior air of the dryer frame 21. The interior air inlet 27, which is formed at the one side of the dryer frame 21, is to allow the re-inflow of the interior air dried through the condensation system 60.

The interior air outlet 25 and the interior air inlet 27 may be positioned to be opposite to each other around the center of the dryer frame 21 or to be in line, spaced apart from each other such that the interior air is discharged through the interior air outlet 25 and re-enters through the interior air inlet 27, to circulate.

The heating jacket 30 is to hold the waste heat supplied from the waste heat supply unit 50, so as to be in contact with the outer surface of the dryer drum 20.

In FIG. 3 and FIG. 4, the heating jacket 30 includes a heating frame 31, a hot-air inlet 33 and a hot-air outlet 35. The heating frame 31 is shaped to wrap the dryer frame 21. The hot-air inlet 33, which is positioned in the heating frame 31, is to receive the waste heat supplied from the waste heat supply unit 50 and to make the inflow thereof between the dryer frame 21 and the heat frame 31. The hot-air outlet 35, which is positioned in the heating frame 31, is to discharge the waste heat which has transmitted the heat energy to the dryer frame 21 after the inflow of the waste heat through the hot-air inlet 33.

The hot-air inlet 33 is positioned at a lower part and the hot-air outlet 35 is positioned at an upper part, so that the waste heat entering the hot-air inlet 33 diffuses upwardly through the convention current and the diffused waste heat transmits the heat energy to the overall outer surface of the dryer frame 21 and then is discharged to the outside through the hot-air outlet 35.

The agitator 40 is to agitate the food waste received in the dryer drum 20, to be overall exposed to the heat energy of the waste heat transmitted by the heating jacket 30.

Figure 5:
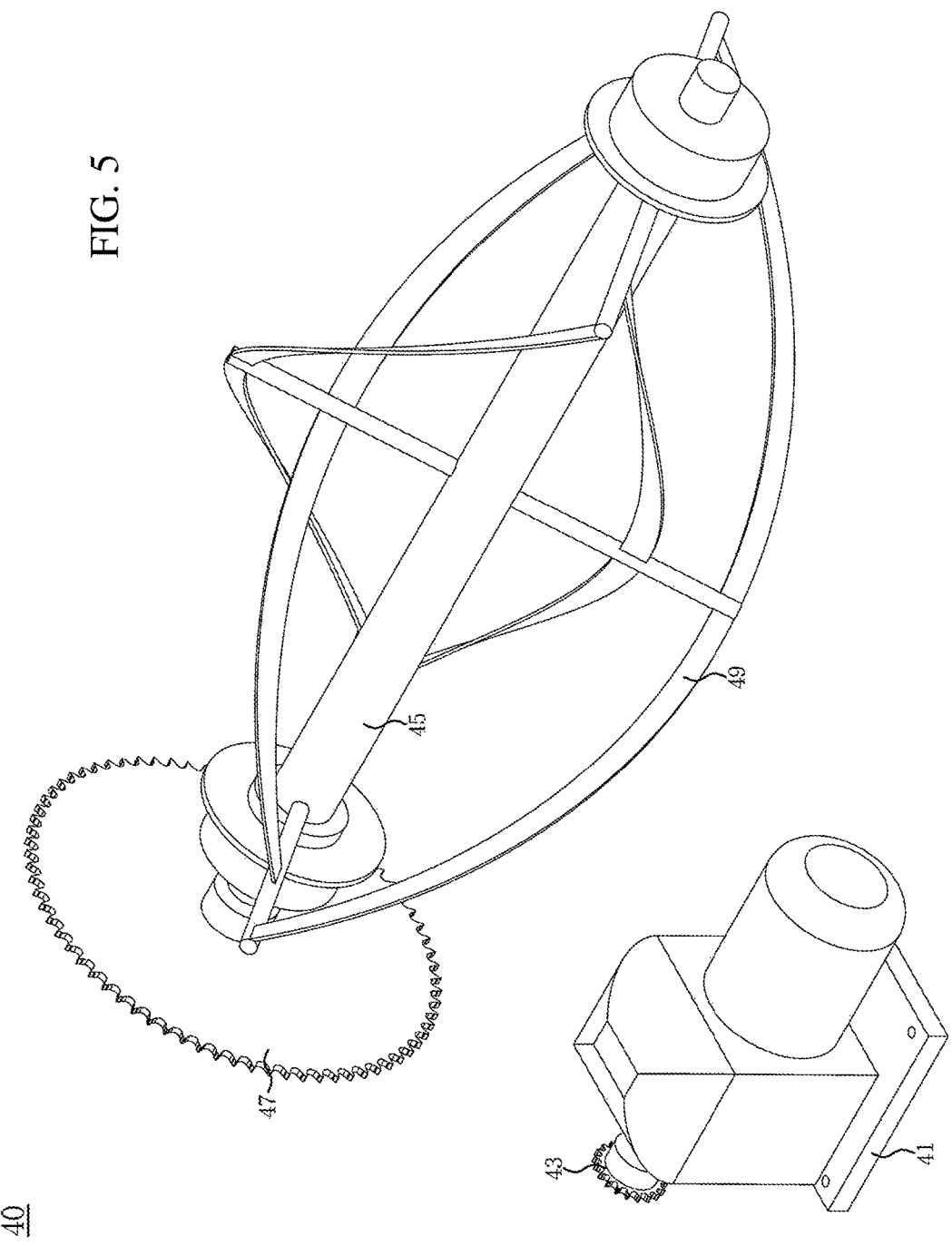
FIG. 5 is a perspective view of an agitator of FIG. 1.

In FIG. 5, the agitator 40 includes an actuator 41, a driving gear 41, an agitation shaft 45, an agitation shaft gear 47 and an agitation blade 49. The actuator 41 is positioned in the main frame 10. The driving gear 43 is positioned at the actuator 41, to transfer the power of the actuator 41. The agitation shaft 45 is fixed in the dryer drum 40, to self-rotate. The agitation shaft gear 47 is positioned around the agitation shaft 45, to receive the power from the driving gear 41. The agitation blade 49 is positioned at the outer surface of the agitation shaft 45, to agitate the food waste inside the dryer drum 20.

The rotation radius of the agitation blade 49 is within the range corresponding to the semicircular-shaped bottom of the dryer frame 21, such that the food waste received inside the dryer drum 20 is overall agitated by the agitator 40.

The actuator 41 is positioned at the connection plate 17, to be stably driven to transfer the power to the agitation blade 49.

The waste heat supply unit 50 is to supply the waste heat (P), which is released during a process of incinerating waste, to the heating jacket 30.

The condensation system 60 is to remove moisture included in the interior air of the dryer drum 20, to increase the drying efficiency of the food waste dryer utilizing waste heat.

Figure 6:
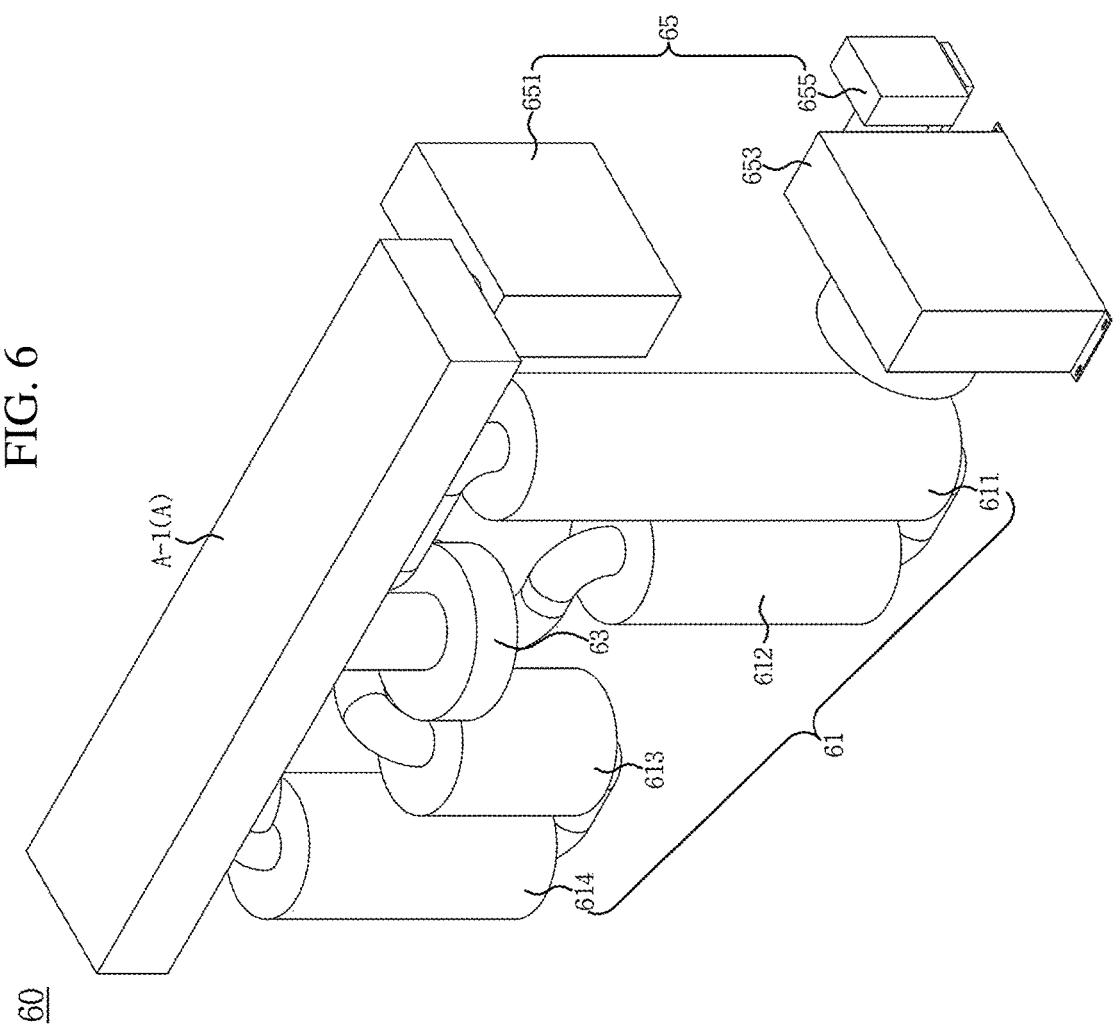
FIG. 6 is a perspective view of a condensation system of FIG. 1.
Figure 7:
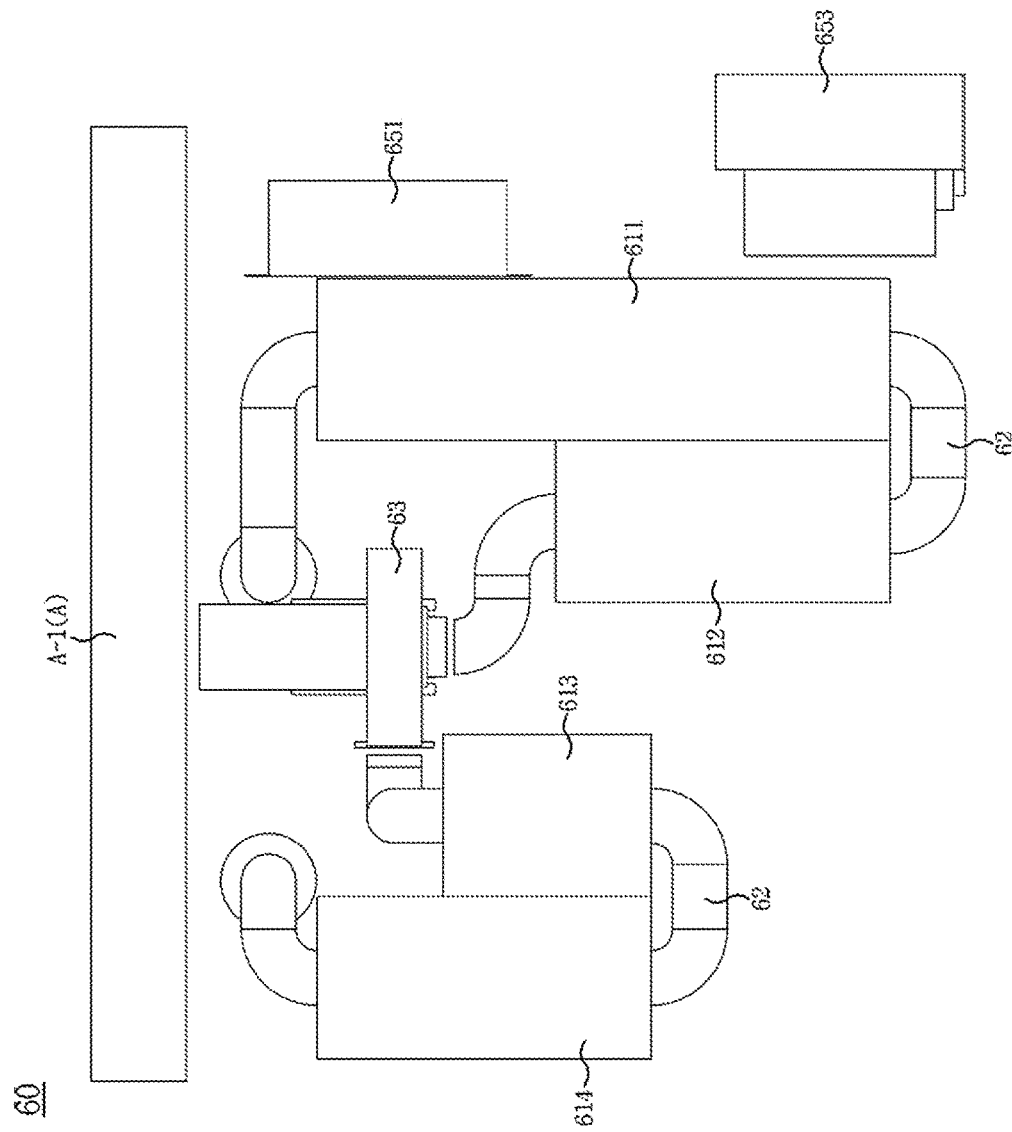
FIG. 7 is a front view of the condensation system of FIG. 6.

In FIG. 6 and FIG. 7, the condensation system 60 includes a plurality of condensers 61, a fan 63 and a cooling system 65. The condensers 61 are connected to one another and connected to the hot-air inlet 33 and the hot-air outlet 35 of the dryer drum 20, to move the interior air of the dryer drum 20. The fan 63 is positioned between the condensers, to transfer the interior air. The cooling system 65 is to collect the moisture from the interior air, by supplying a coolant to the condensers.

Figure 8:
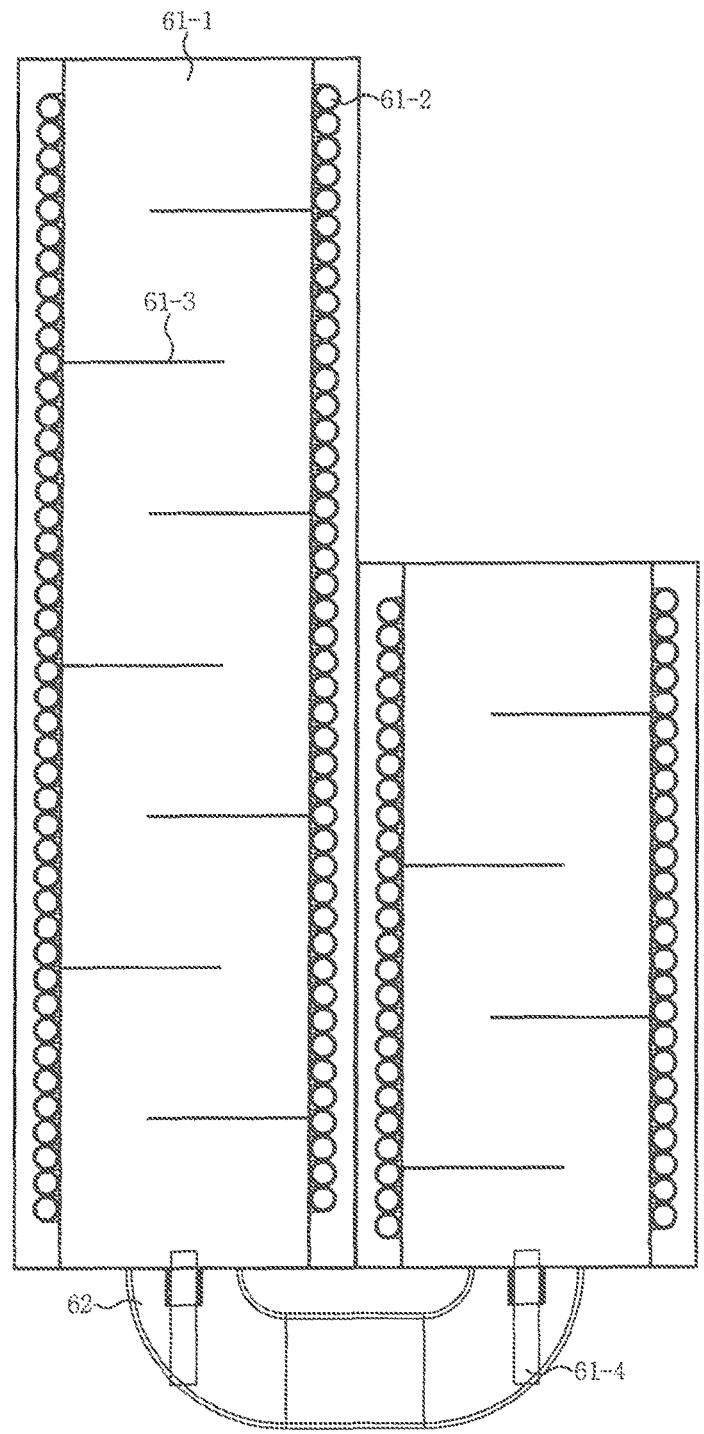
FIG. 8 is a cross-sectional view of a condenser of FIG. 7.
Figure 9:
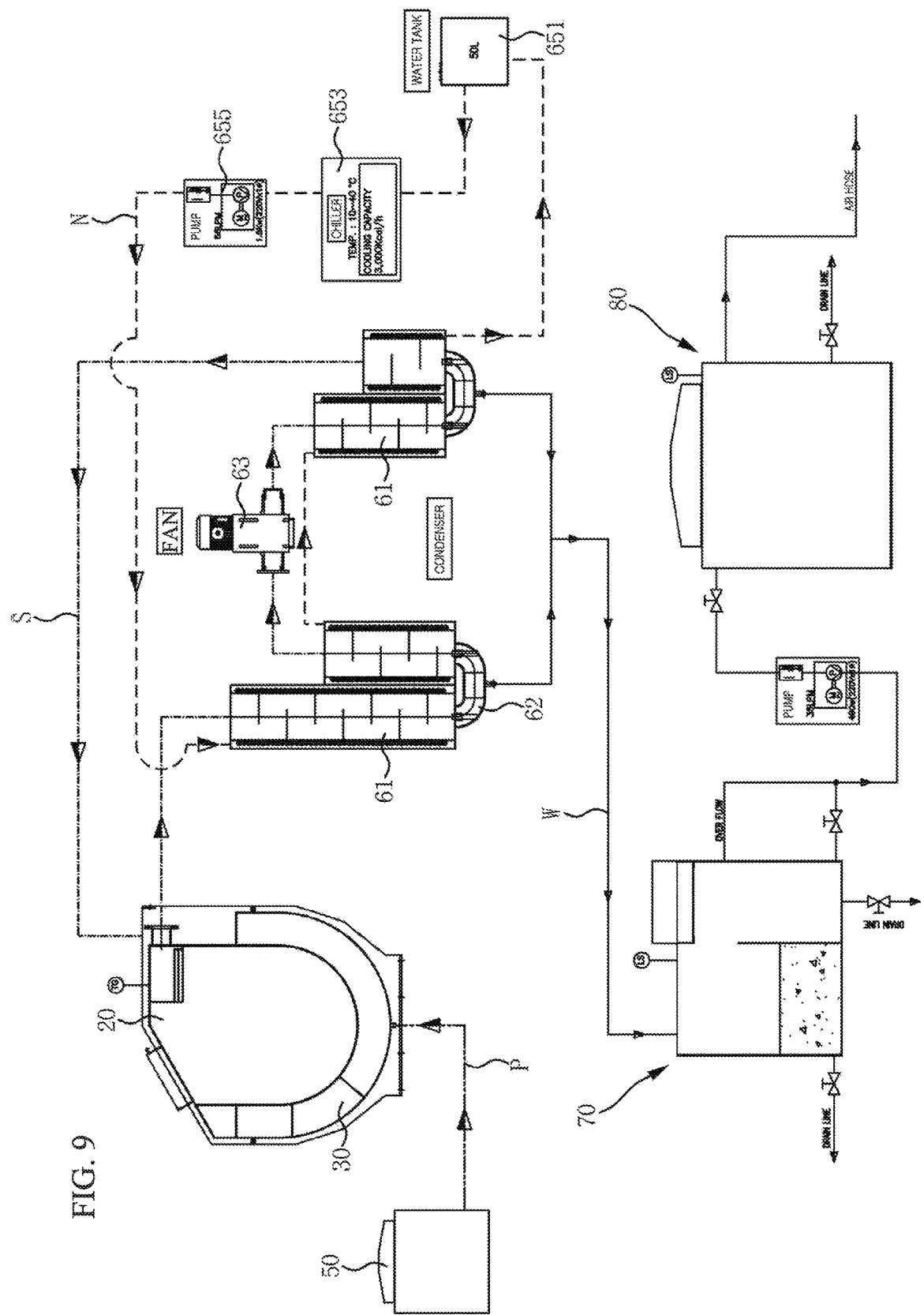
FIG. 9 is a flow diagram of the flow of an interior air, a coolant and a condensate water in the dryer drum.
Figure 10:
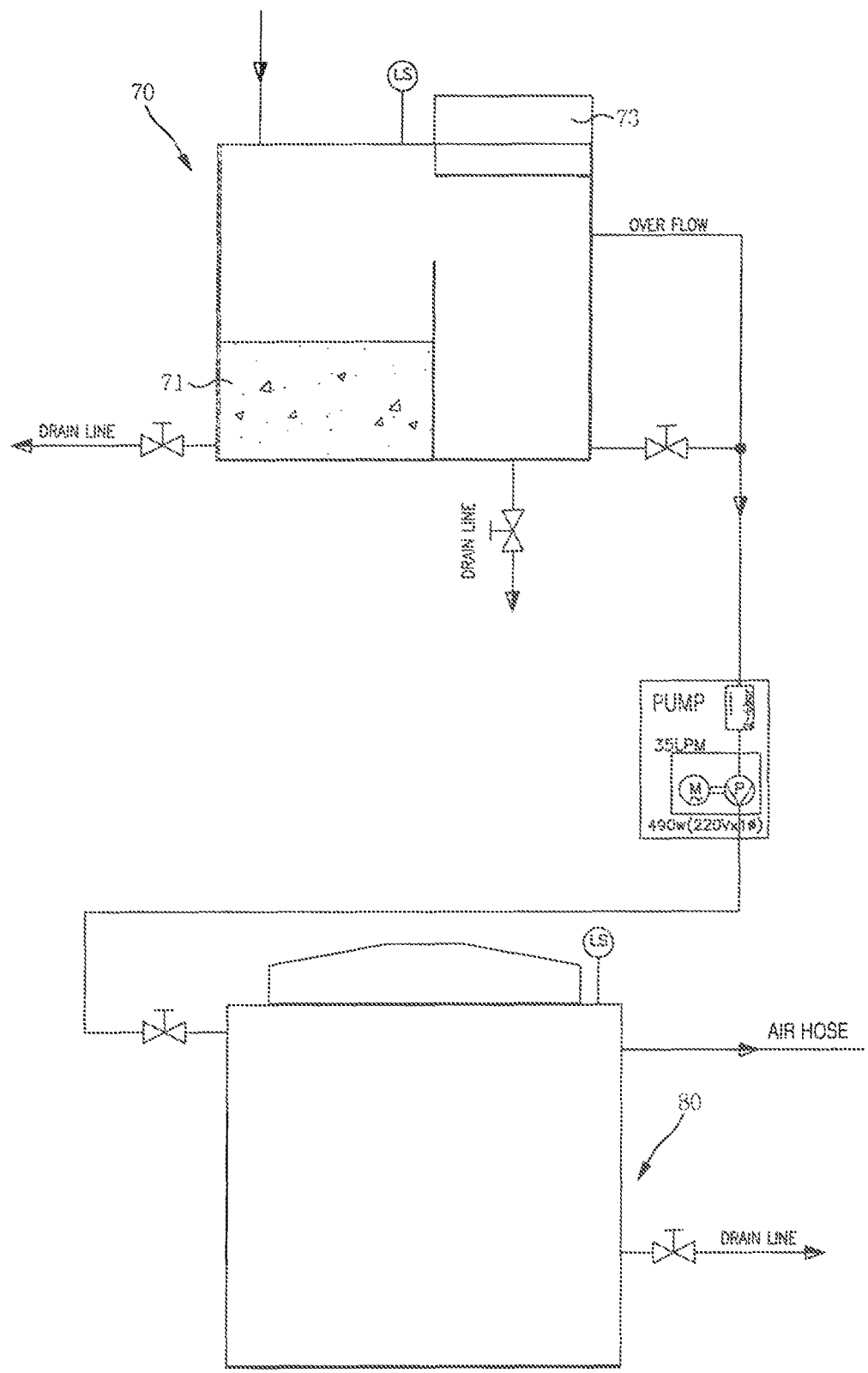
FIG. 10 is a detailed view of a condensate water purification tank and a condensate water storage tank of FIG. 9.

More specifically, in FIG. 8, the condenser 61 includes an interior air circulation well 61-1 to circulate the interior air and a cooling pipe 61-2 which is positioned at the inner surface of the interior air circulation well 61-1, to circulate the coolant. The moisture of the interior air circulating inside the interior air circulation well 61-1 is collected at the inner surface of the interior air circulation well 61-1, by the low temperature of the coolant circulating in the cooling pipe 61-2.

The interior air (S) moves to another condenser through a condenser connecting pipe 62 formed to connect the condensers 61. The moisture collected inside the condenser 61 is collected in a condensate water purification tank through a condensate water movement pipe 61-4 positioned under the condenser.

The condenser 61 further includes an interior air guide 61-3. While the interior air passes the inside of the condenser 61, moisture conflicts with the interior air guide 61-3, increasing the condensation efficiency of moisture through the coolant (N).

Further, the condensers 61 are provided with the coolant having different temperatures, to remove the moisture of the interior air and to change the temperature of the interior air.

An embodiment of the present invention will be described, in more detail, with reference to FIG. 6 and FIG. 7. The condensers 61 include a first condenser 611, a second condenser 612, a third condenser 613 and a fourth condenser 614. The first condenser 611 is provided with the coolant released from the cooling system 65, the second condenser 612 is provided with the coolant released from the first condenser 611, the third condenser 613 is provided with the coolant released from the second condenser 612, the fourth condenser 614 is provided with the coolant released from the third condenser 613 and the coolant discharged from the fourth condenser 614 returns to the cooling system 64.

The initial temperature of the coolant released from the cooling system 65 is about 25° C.~30° C., and after the moisture of the interior air inside each of the condensers is condensed through the first to third condensers 611, 612, 613, the temperature rises to about 60° C.

While the moisture of the interior air is collected in the fourth condenser 614, the heat energy is returned to the interior air having the temperature lowered by the coolant through the first to third condensers 611, 612, 613, to raise the temperature of the interior air.

The inside temperature of the dryer drum 20 which is heated by the waste heat is formed to be about 60° C.~70° C. and the temperature of the coolant released from the cooling system 65 is formed to be about 25° C.~50° C. Since the coolant condenses the moisture of the interior air of each of the condensers while passing through the first to third condensers 611, 612, 613, the temperature of the coolant raises to about 60° C. In the fourth condenser 614, the interior air of the fourth condenser 614 is preheated by the coolant and the preheated interior air is re-sent to the inside of the dryer drum 20.

Therefore, since the air inside the dryer drum 20 is kept in a dry state and the temperature thereof is also kept high, the food waste received in the dryer drum 20 is rapidly dried.

Further, since the first to fourth condensers 611, 612, 613, 614 are different from one another in size, the condensation area and moisture condensation amount of each condenser vary.

More specifically, since the first condenser 611 is provided with the steam containing a great amount of moisture from the dryer drum 20, it is formed to be the largest, to remove the moisture of the steam by using a large area.

The second condenser 612 is provided with the steam from which a certain amount of moisture has been removed. Thus, the second condenser 612 is relatively smaller than the first condenser 611 but is formed to be the second largest.

The steam which is supplied to the third condenser 613 contains a small amount of moisture since the moisture has been removed in the first and second condensers 611, 612. The third condenser 613 is formed to be the smallest so that a small amount of moisture is minutely collected from the steam in the narrow area.

The fourth condenser 614 is provided with the steam from which moisture has been almost removed through the first to third condensers 611, 612, 613. Thus, preheating rather than collecting the moisture is performed to improve the drying efficiency before the steam re-enters the dryer drum 20.

Therefore, the fourth condenser 614 is formed to be the third largest.

In FIG. 6, the cooling system 65 includes a coolant tank 651 to store the coolant, a coolant cooler 653 connected to the coolant tank 651, to cool the coolant, and a coolant supply pump 655 connected to the coolant cooler 653, to move the coolant.

The condensation system 60 further includes a condensate water purification tank 70 to purify the condensate water (W) generated by the condensers.

More specifically, the condensate water purification tank 70 further includes a condensate water tank 71, and the condensate water moving through the condensate water movement pipe 61-4 is stored in the condensate water tank 71.

The condensate water tank 71 where the condensate water is stored is added with zeolite and activated carbon, to reduce the pollution of the condensate water.

A deodorant tower 73 is formed on the condensate water purification tank 70, to purify and discharge the steam inside the condensate water purification tank 70.

More specifically, the condensate water collected into the condensate water purification tank 70 includes water and steam. Since this water and steam have a high pollution level, these are purified through a counteragent, to be processed.

The water element of the condensate water is collected in the condensate water tank 71 and simultaneously neutralized by the addition of zeolite and activated carbon, then stored in a separate condensate water storage tank 80 to be batch-processed.

The steam element of the condensate water to be discharged is purified by providing a purification filter to the deodorant tower 73 positioned on the condensate water purification tank 70.

An outdoor box (A) is positioned in the main frame 10. The outdoor box includes a control unit A-1 which is operatively connected to the touch panel 19, to control each constitution of the food waste dryer through the touch panel 19.

Accordingly, while example embodiments of the present invention are capable of various modifications and alternative forms, embodiments of the present invention are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention.

INDUSTRIAL APPLICABILITY

It is used to improve the drying efficiency of the food waste dryer.

The invention claimed is:

1. An improved food waste dryer utilizing waste heat, which is a food waste dryer to dry the food waste including a main frame (10), a dryer drum (20) with an access door (23) positioned in the main frame (10), and an agitator (40) positioned in the dryer drum (20), the improved food waste dryer comprising:
a waste heat supply unit (50) to supply waste heat released by a waste incineration plant,
a heating jacket positioned (30) on the outer surface of the dryer drum (20) to heat the dryer drum (20), with a hot-air inlet (33) to receive the waste heat from the waste heat supply unit (50) and a hot-air outlet (35) to discharge the waste heat inside the dryer drum (20), and
a condensation system (60) positioned in the main frame (10), to remove moisture included in the interior air of the dryer drum (20) to increase the drying efficiency of the food waste dryer using waste heat,
wherein the condensation system (60) further comprises:
a plurality of condensers (61) connected to one another, to allow the movement of the interior air of the dryer drum (20),
a fan (63) positioned between the condensers (61), to transfer the interior air, and
a cooling system (65) to supply a coolant to the condensers (61) to collect the moisture from the interior air, so that the coolant of a different temperature is supplied to each of the condensers to remove the moisture of the interior air and to change the temperature of the interior air,
wherein the condensers (61) include: a first to fourth condensers (611, 612, 613, 614) which are different from one another in size such that the condensation area and the moisture condensation amount of each condenser are different, the coolant supplied from the cooling system (65) passes through the first, second, third and fourth condensers (611, 612, 613, 614) in order and then returns to the cooling system (65), the first condenser (611) is formed to be the largest in size, the second condenser (612) to be relatively smaller than the first condenser (611), and the fourth condenser (614) to be relatively smaller than the second largest (612) and the third condenser (613) to be the smallest,
wherein the inside temperature of the dryer drum (20) heated by the waste heat is kept at 60° C.~70° C. and the temperature of the coolant supplied from the cooling system (65) to the first condenser (611) is 25° C.~30° C., and the temperature of the coolant released from the third condenser (613) through the second condenser (612) is kept at 60° C., so that the interior air of the fourth condenser (614) is preheated by the coolant supplied to the fourth condenser (614), and
wherein the condensation system (60) further comprises:
a condensate water purification tank (70) to purify condensate water generated from the condensers (61), the condense water purification tank (70) further includes:
a condensate water tank (71) to collect the condensate water, the condensate water collected in the condensate water tank (71) which is added with zeolite and activated carbon to purify any contamination of the condensate water, and
a deodorant tower (73) such that the condensate steam generated from the condensate water is purified to be discharged.

2. The improved food waste dryer utilizing waste heat according to claim 1,
wherein the condensers (61) further includes interior air guides (61-3), so that when the interior air passes the inside of the condensers (61), the moisture conflicts with the interior air guides (61-3), to increase the condensation efficiency of moisture through the coolant.

* * * * *